(12) United States Patent
Kong

(10) Patent No.: US 7,607,921 B2
(45) Date of Patent: Oct. 27, 2009

(54) SWITCH FOR PERIPHERAL I/O DEVICES

(75) Inventor: Xiang-Yun Kong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/102,017

(22) Filed: Apr. 14, 2008

(65) Prior Publication Data

US 2009/0163044 A1    Jun. 25, 2009

(30) Foreign Application Priority Data

Dec. 24, 2007   (CN) .................. 2007 2 0201758 U

(51) Int. Cl.
*H01R 13/04* (2006.01)
(52) U.S. Cl. ........................................... 439/55
(58) Field of Classification Search ............ 439/55; 710/67, 1, 316; 361/752; 341/26; 345/163
See application file for complete search history.

(56) References Cited

U.S. PATENT DOCUMENTS

| 7,047,331 | B2 * | 5/2006 | Dickens ................. 710/63 |
| 2003/0222801 | A1 * | 12/2003 | Ying et al. .............. 341/26 |
| 2005/0172039 | A1 * | 8/2005 | Hsu ..................... 710/1 |

FOREIGN PATENT DOCUMENTS

JP          07-115358       *  5/1995

* cited by examiner

*Primary Examiner*—Alexander Gilman
(74) *Attorney, Agent, or Firm*—Frank R. Niranjan

(57) ABSTRACT

A switch for switching a set of peripheral devices between two computers comprises at least one chip. The at least one chip has a selected signal pin, a group of invariable pins and two groups of variable pins. Each invariable pin corresponds to two variable pins. The group of invariable pins connects to the peripheral devices. Each of the two groups of variable pins connects to one of the two computers. Each invariable pin selectively connects to one of the corresponding two variable pins depending on the states of the selected signal pin to connect the set of peripheral devices to the selected computer.

4 Claims, 4 Drawing Sheets

SWITCH FOR PERIPHERAL I/O DEVICES

BACKGROUND

1. Technical Field

The present invention relates to a switch and, more particularly, to a switch for switching peripheral I/O devices connected to different computer mainframes.

2. Description of Related Art

The wide proliferation of personal computers and networks allows people to utilize the networks to search for and provide information. Currently, network requests are higher, and network-related enterprises have to buy large numbers of computers and network equipment to satisfy user requests. For example, Internet service providers and virtual host providers need to buy a lot of server computers to rent to users. Because these providers may supply a fast network environment, a lot of companies are willing to rent their server computers. The management and trouble shooting of these computers is important. A larger server computer provider has thousands of server computers. Control of each of these computers requires a monitor, a keyboard, and a mouse. Actually, each of these computers spends little time being monitored and controlled with the monitor, keyboard and mouse. Most of the time, the server computers need no peripheral devices for control. Control of each computer with a respective set of these peripheral devices incurs high operation costs and is not necessary. Such peripheral devices also waste space. In resolution of these problems, a KVM (Keyboard, Video, and Mouse) switch connected with a monitor, a keyboard and a mouse is utilized to control a plurality of server computers.

SUMMARY

A switch for switching a set of peripheral devices between two computers comprises at least one chip. The at least one chip has a selected signal pin, a group of invariable pins and two groups of variable pins. Each invariable pin corresponds to two variable pins. The group of invariable pins connects to the peripheral devices. Each of the two groups of variable pins connects to one of the two computers. Each invariable pin selectively connects to one of the corresponding two variable pins depending on the states of the selected signal pin to connect the set of peripheral devices to the selected computer.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
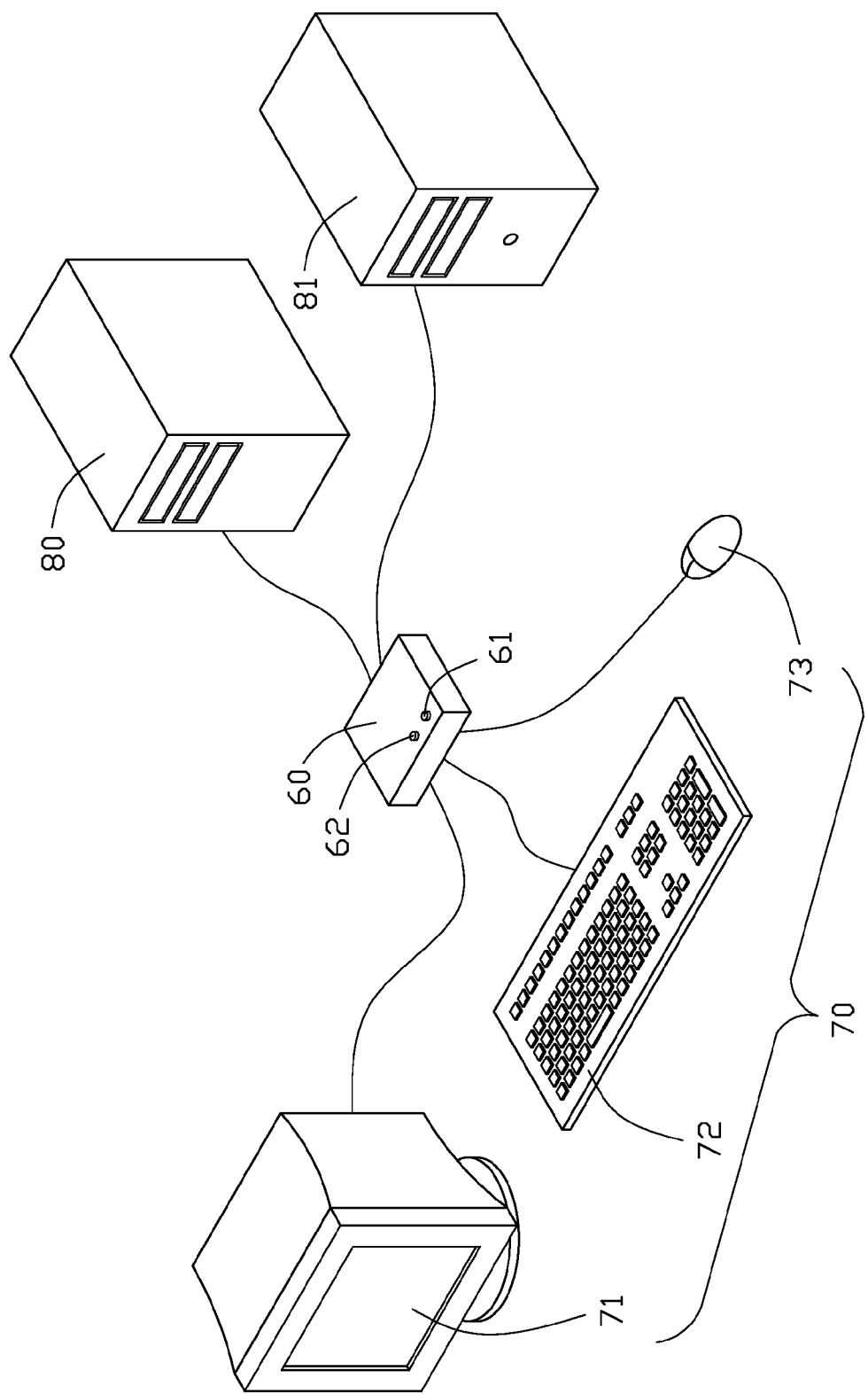
FIG. 1 is a schematic view of a KVM switch configured in accordance with the preferred embodiment of the present invention.

Referring to FIGS. 1, 2, 3, and 4, a KVM switch 60 in accordance with the present invention is shown. The KVM switch allows a first computer 80 and a second computer 81 to share a set of peripheral devices 70, which includes a monitor 71, a keyboard 72, and a mouse 73. The KVM switch 60 enables a user to selectively connect the set of peripheral devices 70 to the computer 80 or the computer 81. The KVM switch 60 comprises a button circuit, which comprises a first button 61, a second button 62, and an on-off switch K1 for choosing one of the computers 80, 81. The KVM switch 60 has three VGA (Video Graphic Array) ports 601, 602, 603, and four PS/2 ports 604, 605, 606, 607. The VGA ports 602, 603 connect with the VGA ports of the computers 80, 81 respectively. The PS/2 ports 606, 607 connect with the PS/2 ports of the computers 80, 81 respectively. The set of peripheral devices 70 includes a monitor 71, a keyboard 72, and a mouse 73. The monitor 71 is connected to the KVM switch 60 via the VGA port 601. The keyboard 72 and mouse 73 are connected to the KVM switch 60 via the PS/2 ports 604, 605 respectively.

Figure 2:
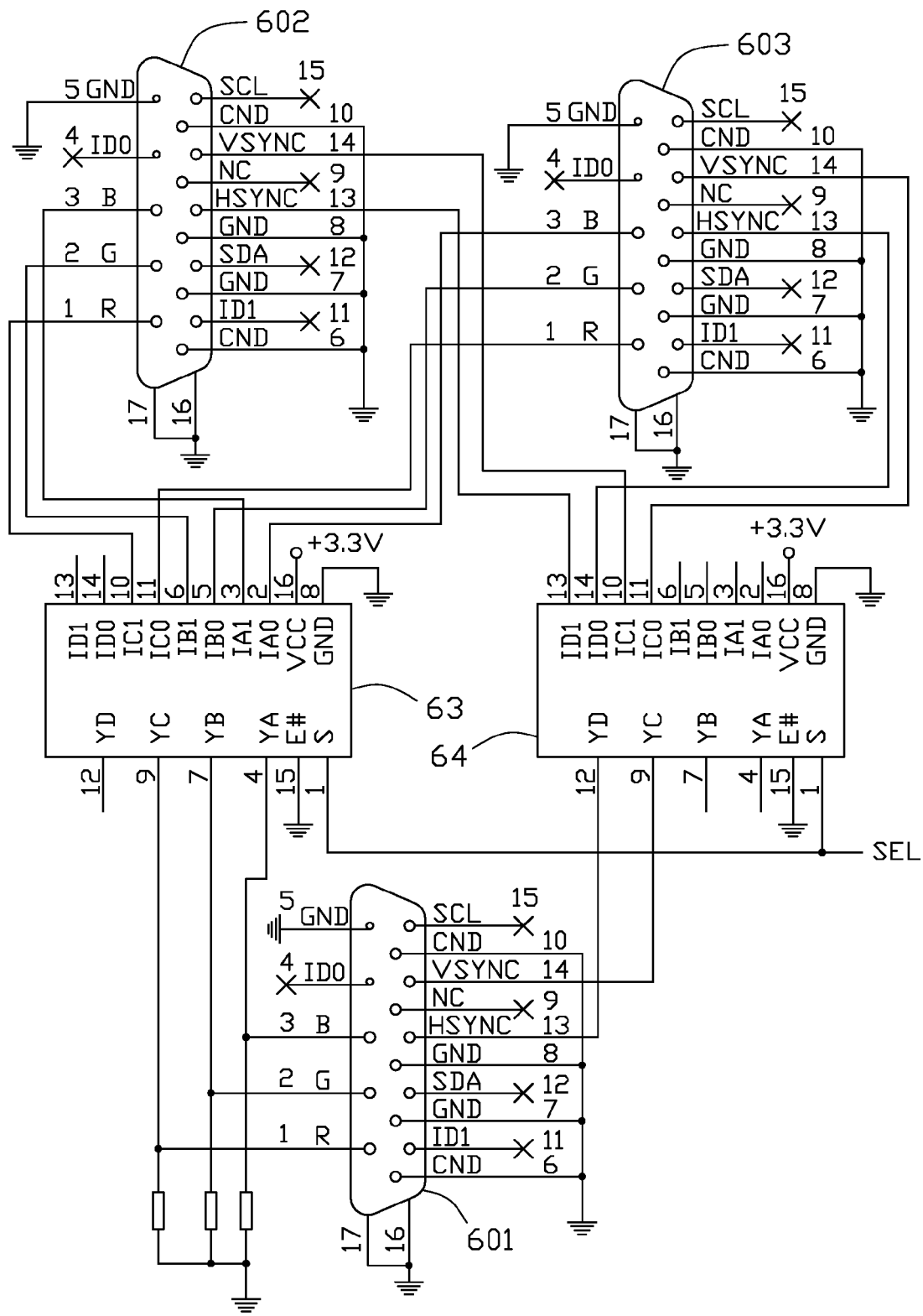
FIG. 2 is a VGA signal switch circuit of the KVM switch of FIG. 1.
Figure 3:
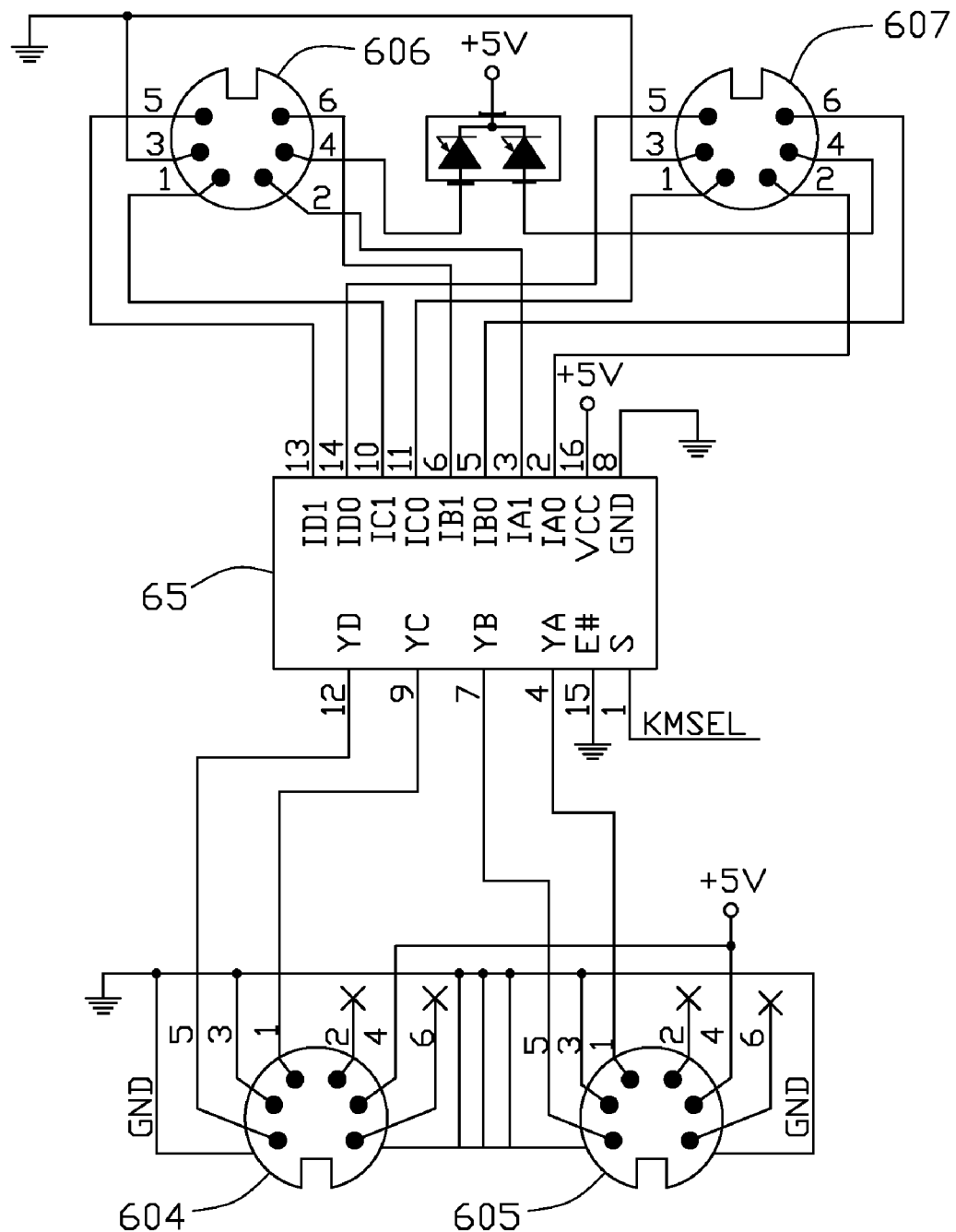
FIG. 3 is a PS/2 signal switch circuit of the KVM switch of FIG. 1.
Figure 4:
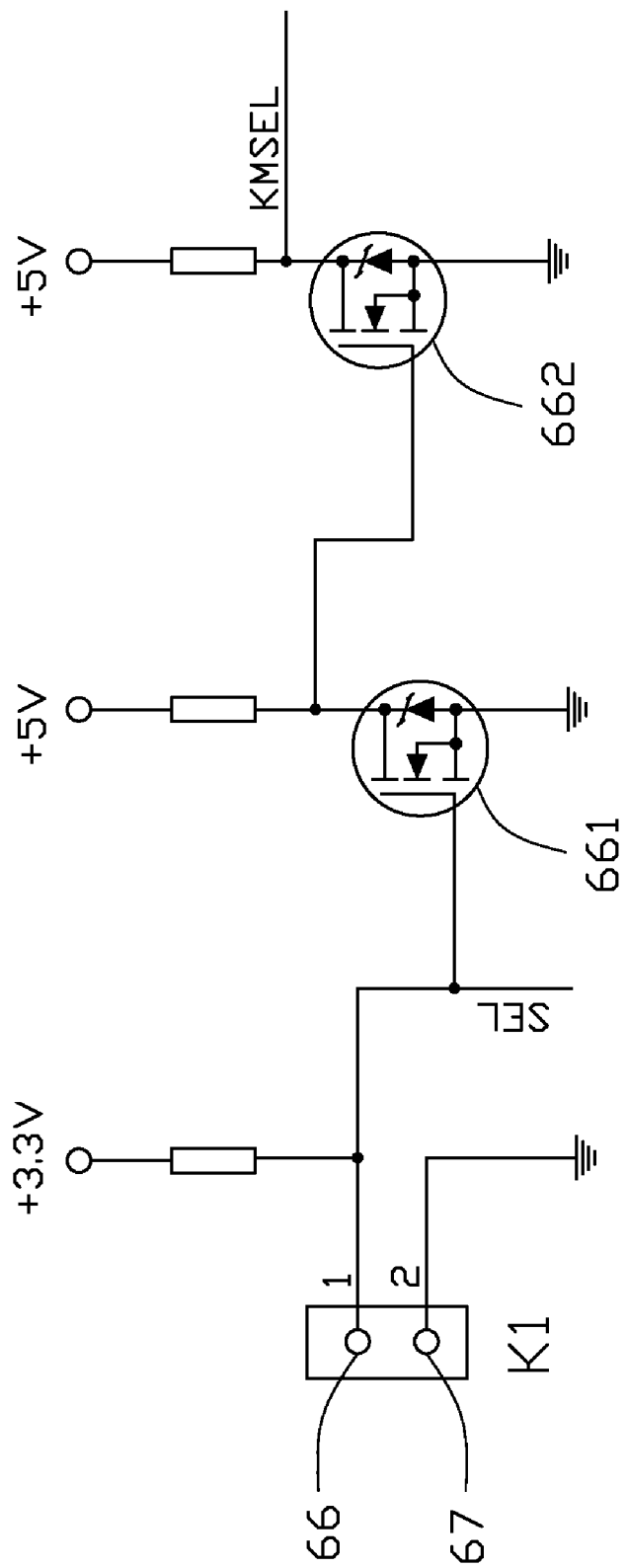
FIG. 4 is a button circuit of the KVM switch of FIG. 1.

Referring to FIGS. 2, 3 and 4, an inner circuit diagram of the KVM switch 60 comprises three IC chips 63, 64, 65 on a printed circuit board (not shown). Each IC chip 63, 64, 65 has 16 pins. The YD pin of each IC chip 63, 64, 65 corresponds to the ID1, ID0 pins. The YC pin of each IC chip 63, 64, 65 corresponds to the IC1, IC0 pins. The YB pin of each IC chip 63, 64, 65 corresponds to the IB1, IB0 pins. The YA pin of each IC chip 63, 64, 65 corresponds to the IA1, IA1 pins. When the "S" pin is set to "1", the YD, YC, YB, YA pins connect to the ID1, IC1, IB1, IA1 pins. When the "S" pin is set to "0", the YD, YC, YB, YA pins connect to the ID0, IC0, IB0, IA0 pins. So we call the YD, YC, YB, YA invariable pins, and the ID1, ID0, IC1, IC0, IB1, IB0, IA1, IA0 variable pins.

The IC chips 63, 64 are used to control the switching of the monitor 71. The "S" pins of the IC chips 63, 64 are connected together, and the IC chips 63, 64 together control to choose between the VGA ports 602 and 603. YC, YB, YA pins of the IC chip 63 connect to R, G, B pins of the VGA port 601 respectively. IC1, IB1, IA1 pins of the IC chip 63 connect to R, G, B pins of the VGA port 602 respectively. IC0, IB0, IA0 pins of the IC chip 63 connect to R, G, B pins of the VGA port 603 respectively. YD, YC pins of the IC chip 64 connect to HSYNC, VSYNC pins of the VGA port 601 respectively. ID1, IC1 pins of the IC chip 64 connect to HSYNC, VSYNC pins of the VGA port 602 respectively. ID0, IC0 pins of the IC chip 64 connect HSYNC, VSYNC pins of the VGA port 603 respectively.

The IC chip 65 is used to control the switching of the keyboard 72 and mouse 73. YD, YC pins of the IC chip 65 connect to pins 5, 1 of the PS/2 port 604 respectively. YB, YA pins of the IC chip 65 connect to pins 5, 1 of the PS/2 port 605 respectively. ID1, IC1, IB1, IA1 pins of the IC hip 65 connect to pins 5, 1, 2, 6 of the PS/2 port 606 respectively. ID0, IC0, IB0, IA0 pins of the IC hip 65 connect to pins 5, 1, 2, 6 of the PS/2 port 607 respectively. Pins 3, 4 of the PS/2 ports 606, 607 connect to ground, and +5V power respectively. For the PS/2 ports 604, 605, pins 2, 6 connect to null, pins 3 connect to ground, and pins 5 connect +5V power.

Referring to FIG. 4, a first terminal 66 of the on-off switch K1 is connected to a first power source +3.3V via a resistor, and the grid of a first CMOS transistor 661. The source of the first CMOS transistor 661 is connected to ground. The drain of the first CMOS transistor 661 is connected to a second power source +5V via a resistor, and to the grid of a second CMOS transistor 662. The source of the second CMOS transistor 662 is connected to ground. The drain of the second CMOS transistor 662 is connected to a third power source +5V via a resistor. A second terminal 67 is connected to ground. When the first button 61 is pressed, the connection between the terminals 66, 67 of the on-off switch K1 is opened, and the +3.3V power is output as the high level SEL signal to the S pins of the IC chips 63, 64. The S pin of the IC chips 63, 64 is set to "1". At this time, in the IC chip 63, the YC pin connects to the IC1 pin, the YB pin connects to the IB1 pin, and the YA pin connects to the IA1 pin. In the IC chip 64, the YD pin connects to the ID1 pin, and the YC pin connects the IC1 pin. Thereby, the first VGA port 601 is connected to the second VGA port 602, connecting the monitor 71 to the first computer 80.

Simultaneously, a high-level KMSEL signal is output to the selected signal pin S of the IC chip 65. The selected signal pin S of the IC chip 65 is set to "1". In the IC chip 65, the YD pin connects to the ID1, the YC pin connects to the IC1 pin, the YB pin connects to the IB1 pin, and the YA pin connects to the IA1 pin. Thus, the PS/2 ports of the keyboard 72 and mouse 73 are connected to the PS/2 port of the first computer 80. Thus, after the first button 61 is pressed, the set of peripheral devices 70 are able to control the first computer 80.

When the second button 62 is pressed, the connection between the first and second terminals 66, 67 of the on-off switch K1 is closed. Because the second terminal 67 is connected to ground the SEL signal to the S pins of the IC chips 63, 64 goes to low level. The selected signal pin S of the IC chips 63, 64 is set to "0". In the IC chip 63, the YC pin connects to the IC0 pin, the YB pin connects to the IB0 pin, and the YA pin connects to the IA0 pin. In the IC chip 64, the YD pin connects to the ID0 pin, and the YC pin connects the IC0 pin. Thereby, the first VGA port 601 is connected to the second VGA port 602, and the monitor 71 is now connected to the second computer 81.

Simultaneously, a low-level KMSEL signal is output to the selected signal pin S of the IC chip 65. The selected signal pin S of the IC chip 65 is set to "0". In the IC chip 65 the YD pin connects to the ID0, the YC pin connects to the IC0 pin, the YB pin connects to the IB0 pin, and the YA pin connects the IA0 pin. Thus, the keyboard 72 and mouse 73 connect to the second computer 81. Thus, after the second button 62 is pressed, the set of peripheral devices 70 are able to control the second computer 81.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switch for switchably connecting at least one peripheral device to a first computer or a second computer, the switch comprising
   a chip including
      a selecting signal pin operable between a first state end a second state,
      a group of peripheral-device terminals for electrically connection to the at least one peripheral device, and
      a first group of computer terminals for electrically connection to the first computer;
      a second group of computer terminals for electrically connection to the second computer; the peripheral-device terminals being respectively switchably connected to the first group of computer terminals when the selecting signal pin operates at the first stare, or the second group of computer terminals when the selecting signal pin operates at the second state;
   wherein the switch further comprises a button circuit, the button circuit comprises an on-off switch, a first transistor, and a second transistor, the on-off switch comprising a first terminal for electrical connection to a first power source and a second terminal, the first terminal configured for outputting a first signal to the grid of the first transistor, the second terminal being grounded, the source of the first transistor being grounded, the drain of the first transistor being for electrical connection to a second power source and outputting a signal to the grid of the second transistor, the source of the second transistor being grounded, the drain of the second transistor being for electrical connection to a third power source and outputting a second signal.

2. The switch as described in claim 1, further comprising a first PS/2 port, the peripheral-device terminals configured for electrical connection to the peripheral device via the PS/2 port.

3. The switch as described in claim 1, further comprising a second PS/2 port, the computer terminals configured for electrical connection to the first or second computer via the second PS/2 port.

4. The switch as described in claim 1, wherein when the on-off switch is open, the selecting signal pin of the at least one chip receives the first signal and the second signal, thereby operating at the first state, when the on-off switch is closed, the selected signal pin receives the first signal and the second signal, thereby operating at the second state.

* * * * *